United States Patent [19]

Struessel

[11] 4,270,566

[45] Jun. 2, 1981

[54] SELF-RESTRICTING SHUTOFF VALVE

[75] Inventor: David A. Struessel, St. Louis, Mo.

[73] Assignee: The United States of America as represented by the Secretary of the Navy, Washington, D.C.

[21] Appl. No.: 102,701

[22] Filed: Dec. 12, 1979

[51] Int. Cl.³ .............................................. F16K 31/34
[52] U.S. Cl. .................................. 137/492.5; 251/27; 137/413
[58] Field of Search ............... 137/485, 488, 492, 413, 137/492.5; 251/25, 27, 63, 297

[56] References Cited

U.S. PATENT DOCUMENTS

| 730,951 | 6/1903 | Mumford et al. | 137/413 |
| 1,488,878 | 4/1924 | Heath | 251/324 |
| 3,363,412 | 1/1968 | Fischer et al. | 251/324 |
| 3,891,182 | 6/1975 | Schwerin | 251/297 |
| 4,119,016 | 10/1978 | Pfeil et al. | 137/413 |

Primary Examiner—William R. Cline
Assistant Examiner—H. Jay Spiegel

[57] ABSTRACT

A self-restricting shutoff valve for use with a fluid leak detector to prevent excessive loss of fluid in event of a high flow-rate leak. A valve spool within a valve body is spring-biased to a partial flow position and is maintained in an opened position by fluid pressure. Upon loss of fluid system pressure, springs move the valve spool to a position to restrict fluid flow through the valve body. When sufficient loss of fluid occurs, a fluid leak detector actuates a pilot valve so that system fluid moves the valve spool to a closed position.

3 Claims, 5 Drawing Figures

SELF-RESTRICTING SHUTOFF VALVE

BACKGROUND OF THE INVENTION

The present invention relates to an automatically operable valve and more particularly to a shutoff valve for use with a fluid leak detector.

In hydraulic systems for aircraft, particularly military aircraft which might be subjected to gun fire, provisions must be made to isolate a ruptured or broken hydraulic line so that fluid from a main reservoir will not become exhausted and render inoperative other branches of a hydraulic system, as well as the ruptured branch. Various types of shutoff valves have been used to isolate a ruptured line. For example, in U.S. Pat. No. 2,493,906, entitled, "Vulnerability Valve", which issued Jan. 10, 1950, to Herbert W. Wishart, there is described a valve which will permit normal flow of actuating fluid to and through the lines of the branch of a hydraulic system but in the event that a line of the branch is ruptured, the valve will automatically isolate the branch from the fluid source.

In one military hydraulic system, a level sensing device is used on a fluid reservoir and, when the level in the reservoir reaches a low level, a pilot valve is actuated to switch fluid to close a shutoff valve. In the event of a high rate leak, however, such as a complete line failure, the loss of fluid can be so great that there will not be sufficient pressure to close the shutoff valve.

SUMMARY OF THE INVENTION

The present invention relates to a self-restricting shutoff valve which has a valve spool slidably mounted in a valve body. An inlet line and an outline line are connected to the valve body and, with respect to these lines, the valve spool can be positioned in an opened position, a closed position, and a restricted position. The spool valve is spring-biased to its restricted position but is maintained to its opened position by fluid pressure. Upon sudden loss of fluid pressure, as by a line rupture, the spool valve is moved by springs to a restricted position. A leak detector is used with the self-restricting valve and, when sufficient fluid loss occurs, a pilot valve is actuated thereby switching fluid to move the spool valve to a closed position.

It is therefore a general object of the present invention to provide a self-restricting shutoff valve which prevents excess loss of fluid in the event of a line rupture.

Other objects, advantages and novel features of the present invention will become apparent from the following detailed description of the invention when considered in conjunction with the accompanying drawings.

DESCRIPTION OF THE PREFERRED EMBODIMENT

Figure 1:
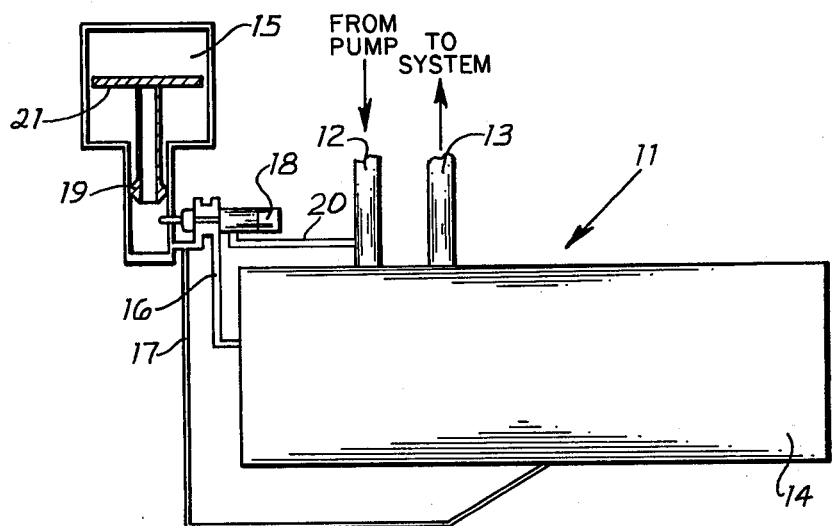
FIG. 1 of the drawings shows a preferred embodiment of the invention being used with a leak detecting system.

Referring first to FIG. 1 of the drawings, there is shown a shutoff valve 11 having an inlet line 12 and outlet line 13 connected to a valve body 14. A reservoir 15 is associated with the shutoff valve 11, and lines 16 and 17 connect the reservoir with valve 11. A pilot valve 18 and line 20 connect line 16 with inlet line 12, and a cam 19 on piston 21 within reservoir 15 actuates pilot valve 18 when the height of fluid within reservoir is reduced to a certain level. The piston 21, cam 19 and pilot valve 18 comprise the fluid leak detector. Upon actuation of pilot valve 18 by cam 19, fluid pressure from line 12 is applied through line 20 and line 16 to one end of a valve spool 22 to move valve spool 22 to a closed position which shuts off flow of fluid to outlet line 13.

Figure 2:
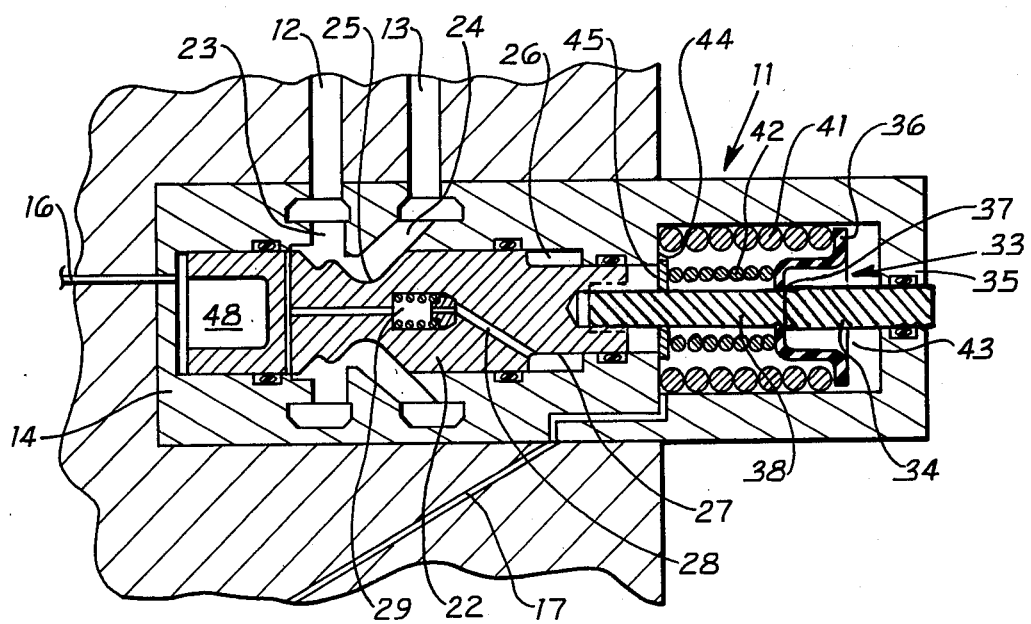
FIG. 2 of the drawings is a longitudinal sectional view of a preferred embodiment of the invention and showing a valve spool in an opened position.
Figure 5:
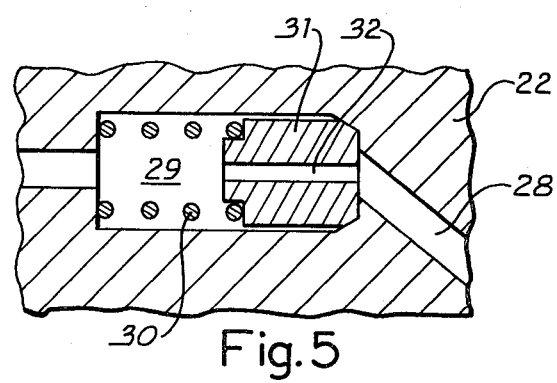
FIG. 5 of the drawings is an enlarged sectional view showing a restrictor valve.

Referring now to FIG. 2 of the drawings, valve spool 22 is shown positioned in an opened position so that there is fuel flow from inlet line 12 through valve body 14 and then outwardly through outlet line 13. Valve body 14 has a passage 23 which communicates with inlet line 12 and also a passage 24 which communicates with outline line 13. A recess 25 in valve spool 22 permits full flow through valve 11 when valve spool 22 is in the position shown in FIG. 2 of the drawings. A cavity 26 is provided between a reduced diameter portion 27 and valve body 14 and system fluid entering valve body 14 through inlet line 12 enters into cavity 26 through a passage 28 in valve spool 22. It is this fluid pressure in cavity 26 which maintains valve spool 22 in the "opened" position shown in FIG. 2. As best shown in FIG. 5 of the drawings, passage 28 has an enlarged portion 29 which contains a spring 30 and poppet valve 31. Poppet valve 31 has a small orifice 32 through which fluid can flow even when poppet valve 31 is seated in a "closed" position, shown in FIG. 5 of the drawings.

Figure 3:
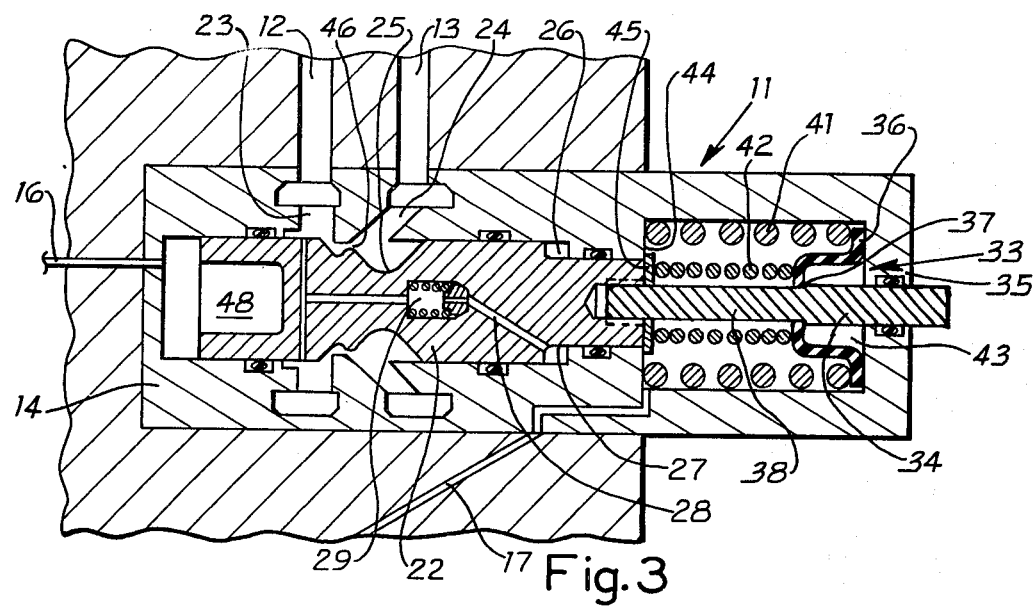
FIG. 3 of the drawings is a view similar to FIG. 2, showing, however, a valve spool in a restricted position.
Figure 4:
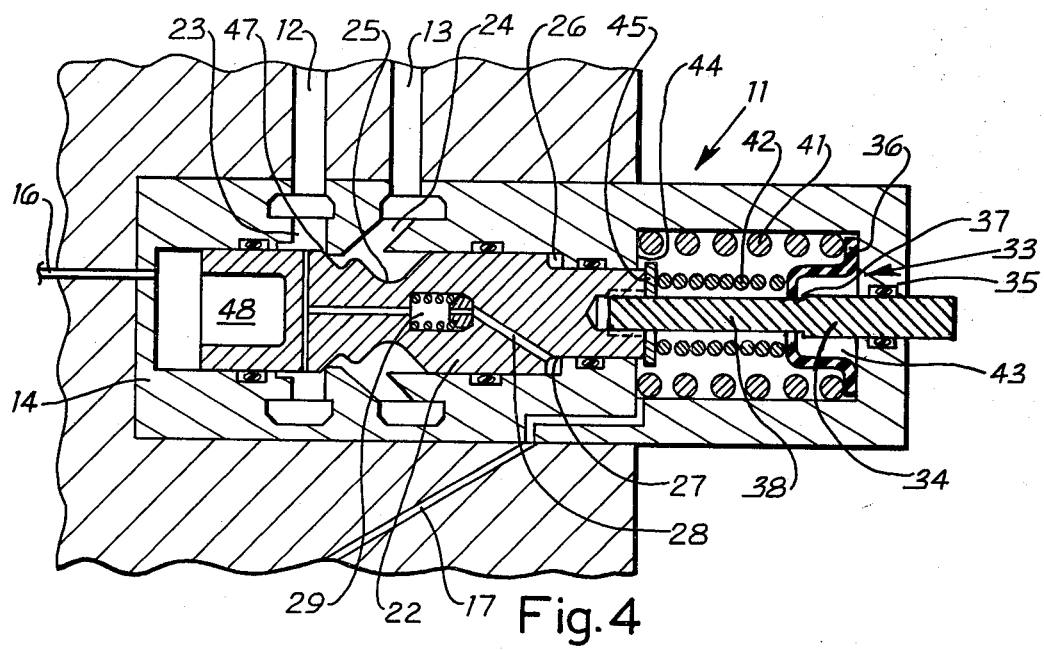
FIG. 4 of the drawings is a view similar to FIG. 2, showing, however, a valve spool in a closed position.

Referring now to FIGS. 2, 3, and 4 of the drawings, a shaft 33 is attached, as by threading, to one end of valve spool 22 and shaft 33 has an enlarged diameter portion 34 that extends through an end 35 of valve body 14. A spring seat 36 has a hole 37 which allows relative movement between the smaller diameter portion 38 of shaft 33 and spring seat 36, however, hole 37 is smaller than the diameter of portion 34. Two concentrically mounted springs 41 and 42 are provided in the end cavity 43 of valve body 14 and engage spring seat 36. Spring 41, which is the larger, is positioned between a shoulder 44 in valve body 14 and spring seat 36, and spring 42 is positioned between a retainer 45 and spring seat 36. Fluid from reservoir 15 is supplied to cavity 43 by line 17.

OPERATION

Under normal operating conditions, reservoir 15, which functions as a bootstrap reservoir, has an internal pressure which is proportional to supply system pressure. The level of piston 21 in reservoir 15 depends upon the volume of fluid in the system and piston 21 moves within a limited range due to the operation of various hydraulic components with differential volumes and also due to thermal expansion or contraction of the fluid in the system. If a leak occurs in one of the hydraulic circuits, the volume of fluid in reservoir 15 decreases and piston 21 moves out of its normal range and cam 19 on piston 21 operates pilot valve 18 to communicate supply pressure to valve 11.

FIG. 2 of the drawings shows valve 11 in a fully opened position. Fluid from a pump enters valve 11 through inlet line 12 and flows past recess 25 and then out of valve 11 through outlet line 13. Also, fluid at system pressure is within cavity 26 and applies a force against the end of valve spool 22 to maintain valve spool 22 in an "opened" position.

Assuming now that a low rate leak occurs in the hydraulic system, the volume of fluid in reservoir 15 decreases, thereby lowering piston 21 and, when sufficient fluid is lost, cam 19 will engage an operating pin on pilot valve 18 to port supply pressure to cavity 48 in valve 11 via line 16. The area of the end of valve spool 22 which extends into cavity 48 is larger than the opposite end of valve spool 22 which is in contact with the fluid in cavity 26, and the fluid in cavity 48 moves valve spool 22 to the closed position shown in FIG. 4 of the drawings. When valve spool 22 is moving to its closed position, fluid within cavity 26 is forced out through passage 28 and opens poppet valve 31 in the enlarged portion 29 of passage 28.

By way of example, reservoir 15 might be associated with two hydraulic system lines and, upon occurrence of a low rate leak, shuts off one of the hydraulic lines as described above. In the event that the leak was in the other system line, piston 21 will continue to move and cam 19 could be arranged to operate a second pilot valve associated with the second hydraulic system. Upon operation of the second pilot valve which would operate a second valve 11 to isolate the second hydraulic system, an arrangement can be made to open the first valve 11 thereby again making the first hydraulic system operable.

Assuming now that a high rate leak occurs, such as by rupturing of a line, the supply pressure begins to decrease and, when the force applied by the fluid within cavity 26 is less than the force applied by springs 41 and 42, valve spool 22 will move to the restricted position shown in FIG. 3 of the drawings. The forces applied by springs 41 and 42 move valve spool 22 until spring seat 36 contacts the end 35 of valve body 14. Although valve spool 22 is capable of further movement (to the closed position), it is held biased in the restricted position by spring 42. In the restricted position shown in FIG. 3 of the drawings, the flow area of the valve decreases due to the restrictor land moving to a position between inlet line 12 and outlet line 13. Although fluid will continue to be lost due to the rupture line, the supply pressure will be increased as the system pump will be able to overcome the fluid loss. However, when sufficient fluid is lost from reservoir 15, the pilot valve will be actuated and valve spool 22 will move to the closed position as described above for a low rate leak.

When valve spool 22 moves from its opened position (FIG. 2) to its restricted position (FIG. 3), the volume of fluid in cavity 26 is reduced and excess fluid flows from cavity 26 through passage 28, enlarged portion 29 of passage 28 and into passage 12. In order to prevent system pressure from dropping too low, poppet valve 31 in enlarged passage 29 allows rapid flow of fluid from cavity 26 and thus valve spool 22 can move at a high rate. Upon rapid closing of valve 11, pressure upstream of valve 11 rapidly rises and there would be a tendency for valve spool 22 to again move to the opened position. However, before the surge pressure can reach cavity 26, the fluid must pass through the enlarged diameter 29 portion of passage 28 and this fluid flow will close poppet valve 31 and fluid must pass through hole 32 in poppet valve 31. Thus it can be seen that fluid flow into cavity 26 will be at a lesser rate than the flow of fluid from cavity 26 and thus excessive, undamped oscillations of valve spool 22 are prevented.

It can thus be seen that the present invention provides a valve arrangement which will operate automatically to prevent excessive loss of fluid so that there will be adequate fluid pressure to close the valve upon command from a fluid leak detector.

Obviously many modifications and variations of the present invention are possible in the light of the above teachings. It is therefore to be understood that the invention may be practiced otherwise than as specifically described.

I claim:

1. In combination with a fluid leak detector, a self-restricting shut-off valve comprising,
   a first source of fluid under pressure,
   a second source of fluid under pressure lesser in value than the pressure value of said first source of fluid,
   a valve body having a bore,
   an inlet line connecting said valve body to said first source of fluid under pressure and an outlet line connecting said valve body to an operable fluid system having lines subject to rupture,
   a valve spool having a recess and a restrictor land, said valve spool being slidable positionable in said bore to a full-flow position, a partial-flow position and a no-flow position,
   first and second fluid cavities, one each between each end of said valve spool and said valve body,
   spring means biasing said valve spool to a partial-flow position whereby said restrictor land limits fluid flow from said first source through said recess to said outlet line,
   a first passage connecting said first cavity with said first source of fluid whereby fluid in said first cavity biases said valve spool to a full-flow position, and
   a second passage normally connecting said second cavity with said second source of fluid and switchably connectable with said first source of fluid by said leak detector to move said valve spool to a no-flow position when said leak detector detects a loss of said first source of fluid under pressure.

2. In combination with a fluid leak detector, a self-restricting shut-off valve as set forth in claim 1 wherein said spring means comprises a first spring for biasing said valve spool to a partial-flow position and a second spring for resiliently holding said valve spool in said partial-flow position.

3. In combination with a fluid leak detector, a self-restricting shut-off valve as set forth in claim 1 having a restrictor valve in said first passage permitting fluid flow from said cavity through said passage at a greater velocity that fluid flows through said passage into said cavity.

* * * * *